No. 733,366. PATENTED JULY 14, 1903.
L. BRUNI.
COMBINATION TOOL.
APPLICATION FILED NOV. 2, 1901.
NO MODEL.
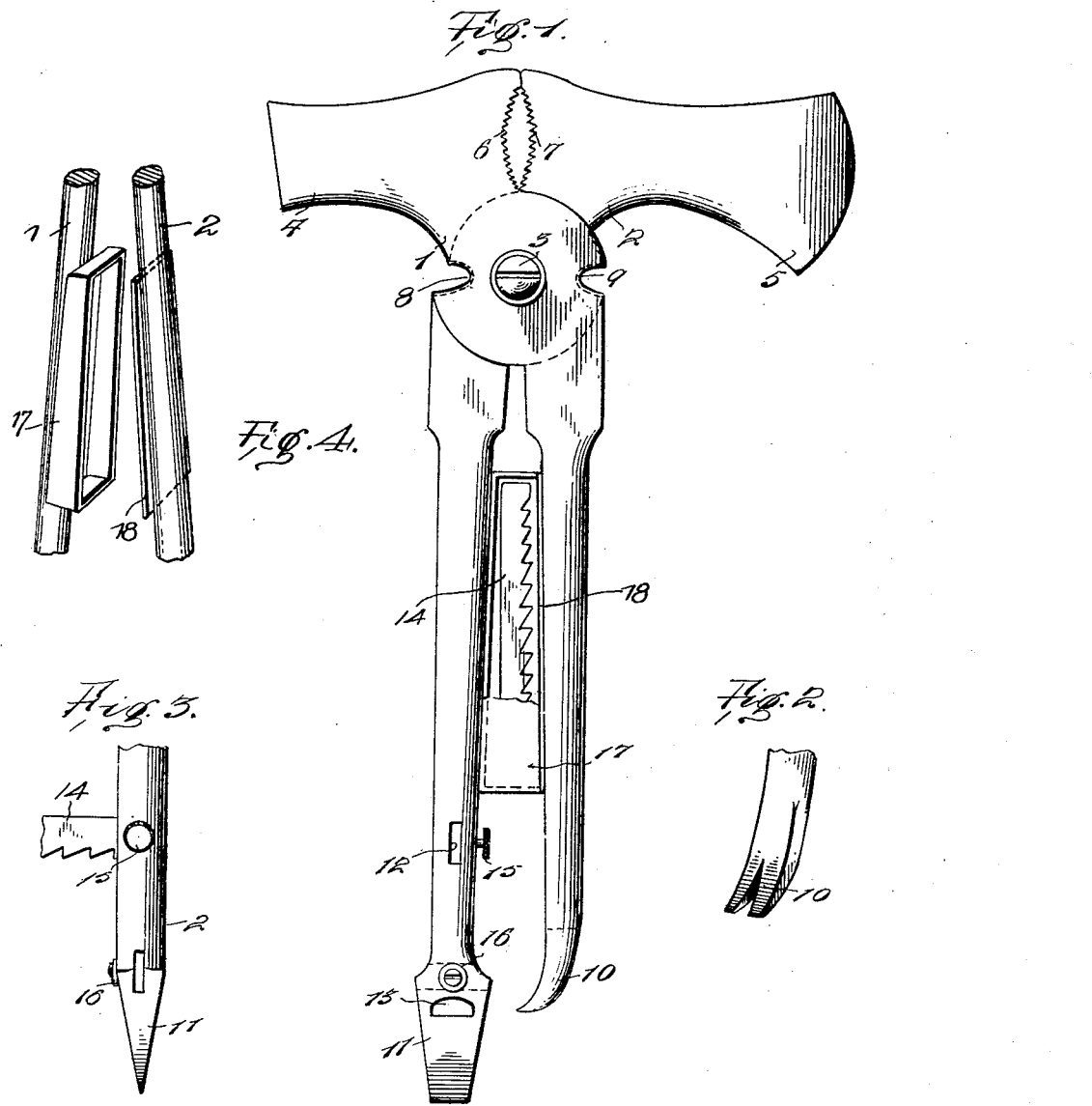

No. 733,366. Patented July 14, 1903.

UNITED STATES PATENT OFFICE.

LOUIS BRUNI, OF LAREDO, TEXAS.

COMBINATION-TOOL.

SPECIFICATION forming part of Letters Patent No. 733,366, dated July 14, 1903.

Application filed November 2, 1901. Serial No. 80,933. (No model.)

*To all whom it may concern:*

Be it known that I, LOUIS BRUNI, a citizen of the United States, residing at Laredo, in the county of Webb and State of Texas, have invented a new and useful Compound Tool, of which the following is a specification.

The invention relates to improvements in combination-tools.

The object of the present invention is to improve the construction of combination-tools and to provide one adapted for a variety of uses and provided with a receptacle designed to contain small tools, nails, screws, and the like and capable of opening and closing automatically as the tools open and close.

The invention consists in the construction and novel combination and arrangement of parts hereinafter fully described, illustrated in the accompanying drawings, and pointed out in the claim hereto appended.

In the drawings, Figure 1 is an elevation of a combination-tool constructed in accordance with this invention. Fig. 2 is a detail view of a portion of one of the members, showing the claw. Fig. 3 is a detail view of a portion of the other bar or member, illustrating the manner of holding a saw-blade. Fig. 4 is a detail perspective view illustrating the handle members open.

Like numerals of reference designate corresponding parts in all the figures of the drawings.

1 and 2 designate bars or members connected together between their ends by a pivot 3 and having enlarged outer portions 4 and 5. The outer portion 4 of the bar or member 1 is enlarged to form a hammer, and the other bar or member has its outer portion 5 enlarged to form a hatchet-blade. The inner opposite faces 6 and 7 of the enlargements 4 and 5 are recessed and provided with teeth to form jaws for enabling the tool to be used as a pair of pincers. The pivoted portions of the bars or members 1 and 2 are provided at their opposite edges with notches 8 and 9, forming wire-cutters. A piece of wire is placed in the notches at either side of the tool when the notches are in alinement, and by opening the tool the notches are carrried out of alinement and the wire is severed, as will be readily understood.

The inner end of the bar or member 1 is provided with a claw 10 for extracting nails, and the other bar or member is provided at its inner end with a screw-driver blade 11, and it has openings or apertures 12 and 13, adapted to receive tools. The opening or aperture 12 consists of a narrow slot and is adapted to receive a saw-blade 14, which is secured to the bar or member by a clamping-screw 15. The aperture 13 is approximately semicircular in cross-section and is designed to receive the shank of a bit. The bar or member 2 is also provided with a clamping-screw 16 for securing a tool in a slot or aperture arranged at right angles to the slot or aperture 12 and shown in dotted lines in Fig. 1 of the drawings. The inner portions of the bars or members are spaced apart to provide a longitudinal opening for the reception of a box 17, secured to the bar or member 2 and having one side open and disposed toward the opposite bar or member 1, which is preferably provided with a cover 18; but the cover may be omitted, as the bar or member 1 will operate to cover the open side of the box. The box, which is designed to contain small tools, nails, screws, and the like, is automatically opened and closed as the bars or members of the tool are opened and closed. The open side of the box or receptacle is contiguous to the handle portion of the bar or member 1, and when the tool is open access is had to the contents of the box or receptacle. This is especially advantageous, as the box or receptacle is opened when the jaws are opened, and when a staple or other fastening device is extracted the act of opening the jaws to remove such fastening device from them opens the box or receptacle and the said fastening device may be readily placed therein. Should it be desired to use the wire-cutter or the jaws 6 and 7 or the claw 10, the contents of the receptacle are removed; but when the tool is employed as a hammer, hatchet, screw-driver, saw, or when any other tool is applied to the bar or member 2, or when the jaws are used as before described, the device may be operated without removing the contents of the box or receptacle.

It will be seen that the tool is simple and comparatively inexpensive in construction, that it is strong and durable, and that its various parts are adapted for a variety of uses. It will also be apparent that the box or receptacle is adapted to contain small tools and material and that it is automatically opened and closed when the tool is opened and closed.

What I claim is—

A tool of the plier type consisting of two pivoted bars or members having handle portions spaced apart when the members are in their closed position, a receptacle formed independently of and carried by the handle portion of one of the members, between the handles, and having an open side disposed toward the other member, a cover for the receptacle formed independently of and carried by the handle portion of the other member and operable thereby for closing the receptacle when the members are closed and for opening the receptacle when the members are opened, whereby the receptacle will be simultaneously opened with the opening of the members for the reception of articles operated upon by the pliers, said handle portions being maintained in their spaced condition when the members are closed solely by engagement of the cover with the receptacle.

In testimony that I claim the foregoing as my own I have hereto affixed my signature in the presence of two witnesses.

LOUIS BRUNI.

Witnesses:
J. M. RODVIGUEZ,
M. G. BENARICLES.